United States Patent [19]

Cassidy

[11] Patent Number: 4,884,173
[45] Date of Patent: Nov. 28, 1989

[54] COMBINATION RUNNING LIGHT AND SPOT LIGHT DEVICE FOR A BOAT

[76] Inventor: Jerald L. Cassidy, 500 Autum Circle, Corbin, Ky. 40701

[21] Appl. No.: 296,006

[22] Filed: Jan. 12, 1989

[51] Int. Cl.[4] ............................................. B60Q 1/00
[52] U.S. Cl. ..................................... 362/61; 362/243; 362/250; 362/427; 362/430; 362/431
[58] Field of Search ................. 362/61, 227, 234, 236, 362/239, 243, 231, 250, 431, 427, 430

[56] References Cited

U.S. PATENT DOCUMENTS 3,833,800  9/1974  Stewart et al. ...................... 362/61
4,228,489  10/1980  Martin ................................. 362/250

Primary Examiner—Stephen F. Husar
Attorney, Agent, or Firm—Jon C. Winger

[57] ABSTRACT

A combination running light and spot light device for a boat which includes a mast having a male fitting at its bottom end which is receivable in a female electrical receptacle. The male fitting includes electrical connectors which join with electrical connectors of the female receptacle completing and electrical connection therewith. A running light is attached to the top end of the mast and is electrically connected to the electrical connectors of the male fitting. A bracket is mounted to the mast for selected pivotal movement about the longitudinal axis of the mast, and a spot light is mounted to the bracket for movement with the bracket about the longitudinal axis of the mast. The spot light is also electrically connected to the electrical connectors of the male fitting.

14 Claims, 2 Drawing Sheets

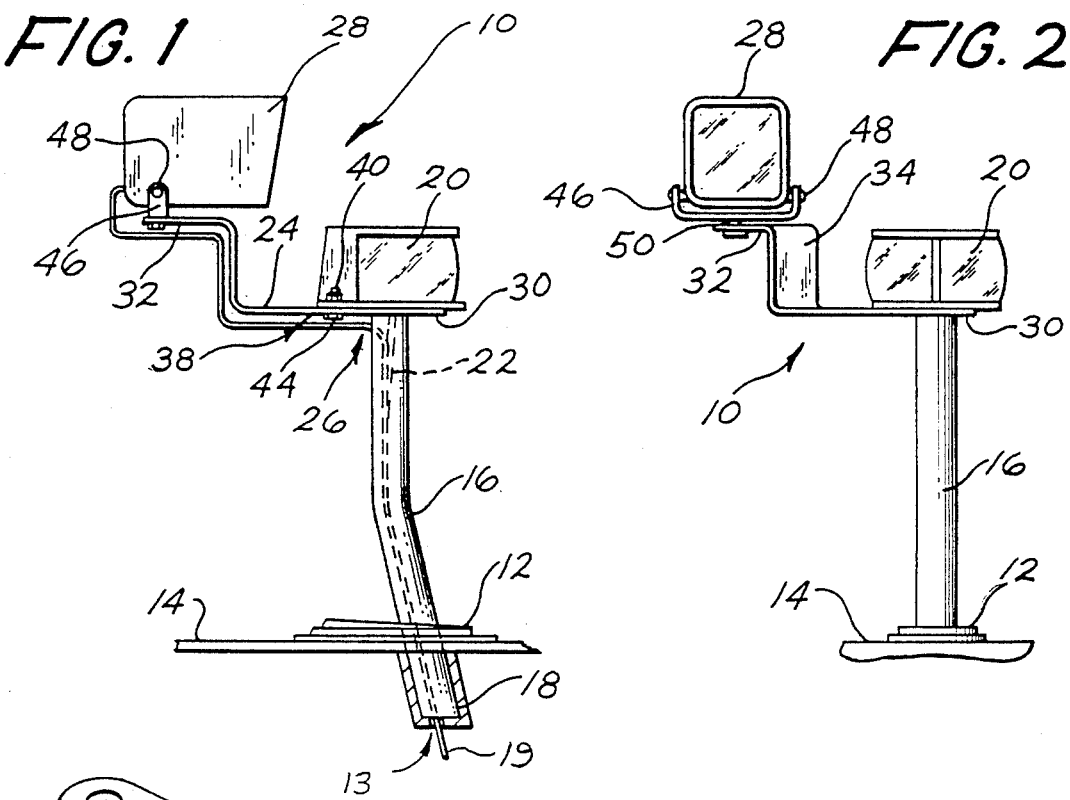

COMBINATION RUNNING LIGHT AND SPOT LIGHT DEVICE FOR A BOAT

BACKGROUND OF THE INVENTION

The present invention relates to lights for boats and more particularly to a combination running light and spot light device for boats.

All boats, by law, must have running lights at the bow with a green light to starboard and a red light to port if the boat is to be operated after daylight. It is typical with smaller boats that the running light is positioned on top of the gunwale at the bow to project above the gunwale and is affixed thereto by fasteners so that it cannot be readily removed. These fixed running lights projecting above the gunwale can interfere with other equipment on the boat and present an obstruction to the people in the boat. For example, in ski boats the projecting running light can be an obstacle to the people in the boat. Also, for example, some fishing boats, commonly called bass boats, often have a chair located at the bow and the projecting light can present an obstacle to the chair or fisherman seated in the chair. Fishing boats also typically use a small trolling motor usually attached to the gunwale of tee boat at the bow so that it can be operated by the fisherman seated next to the bow of the boat to provide for quick directional response of the boat at low trolling speeds. The projecting running light at the bow can interfere with the manipulation of the trolling motor and be an obstacle to the fisherman steering the trolling motor. In addition, the trolling motor can block the light beams from the running light making the light beams impossible to be seen from other boats. Still further, boats such as ski boats and bass boats have low gunwales which make the conventional running light low to the water. This low position of the running light can make it difficult to see at night particularly when the waves may themselves be running high.

In addition, it is desirable to have a spot light on a boat during night operations. It is usual in small boats, particularly those small boats which are essentially all open without a deck such as fishing boats, to use a hand-held spot light. A problem with hand-held spot lights is that they can easily be dropped overboard and lost, and they are also difficult to hold steady. Even with boats having a deck with the spot light affixed to the boat deck, the spot light can also present an obstacle to people on the boat.

The present invention recognizes these drawbacks and provides a solution which eliminates or reduces the consequences thereof.

SUMMARY OF THE INVENTION

The present invention provides a combination running light and spot light device which is readily removed from installation without the use of tools so that the running light and spot light will not be an obstacle or interfere with people and activities on the boat during daylight operations of the boat.

The present invention also provides a combination running light and spot light device which is installed in the conventional female electrical receptacle with which most boats come already equipped and, therefore, can use the boats existing electrical wiring system without modification.

The present invention further provides a running light and spot light device wherein the spot light physically does not interfere with the visibility of the running light beam from other boats.

The present invention also provides a running light and spot light device wherein the beam of light generated by the spot light does not hinder the beam of light generated by the running light.

The present invention still further provides a running light and spot light device wherein the spot light can be turned on and off independently of the running light.

More particularly, the present invention provides a combination running light and spot light device for a boat which includes a female receptacle having electrical connectors for attachment to a boat hull, a mast having a male fitting with electrical connectors at its bottom end receivable in the female receptacle completing an electrical connection therewith, a running light attached to the top end of the mast, an electrical circuit interconnecting the running light and the electrical connector of the male fitting, a bracket mounted to the mast proximate the top end thereof for selected pivotal movement about the longitudinal axis of the mast, means for securing the bracket at a selected position about the longitudinal axis of the mast, a spot light mounted to the bracket for movement with the bracket about the longitudinal axis of the mast, and an electrical circuit interconnecting the spot light and the electrical connector of the male fitting.

BRIEF DESCRIPTION OF THE DRAWINGS

A better understanding of the present invention will be had upon reference to the following description in conjunction with the accompanying drawings wherein like numerals refer to like parts throughout the several views:

FIG. 1 is a side view of a combination running light and spot light device of the present invention;

FIG. 2 is a front view of the combination running light and spot light device of FIG. 1;

FIG. 3 is a perspective view of one embodiment of the bracket used in the combination running light and spot light device of FIGS. 1 and 2;

FIG. 4 is a side view of another embodiment of the bracket used in the combination running light and spot light device of FIGS. 1 and 2;

DETAILED DESCRIPTION OF THE PREFERRED EMBODIMENT

Figure 5:
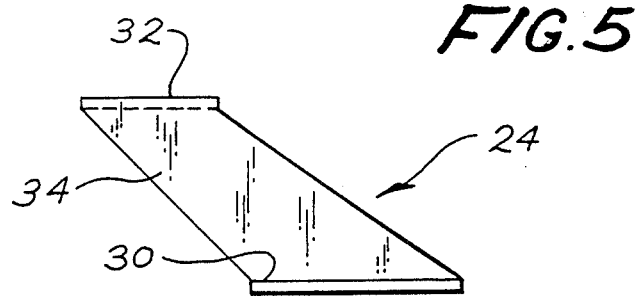
FIG. 5 is a front view of the bracket shown in FIG. 4 as seen in the direction of arrows 5—5 in FIG. 4.

With reference to FIGS. 1 and 2, there is shown a combination running light and spot light device, generally denoted as the numeral 10, of the present invention. The combination running light and spot light device 10 includes a female receptacle 12 having electrical connectors 13 therein for flush attachment to the gunwale 14 of a boat, for example, at the bow of the boat. The female receptacle 12 can be a conventional fitting of the type commonly used in boats for mounting, for example, stern lights to the gunwale of the boat. The electrical connectors 13 of the female receptacle 12 is electrically connected to the electrical system of the boat. The device 10 further includes a mast 16 having a male fitting 18 at its bottom end including electrical connectors 19 which is receivable into the female receptacle 12 such that the connectors 19 at the male fitting complete an electrical connection with the electrical receptacle connectors 13 of the female receptacle 12. A running light 20 is fixed o the top end of the mast 16, and an electrical circuit 22 extends through the mast 16 interconnecting the running light 20 and electrical connector of the male fitting 18. A bracket 24 is mounted to the mast 16 proximate the top end of the mast 16 beneath the running light 20 for selected pivotal movement about the longitudinal axis of the mast 16. The bracket 24 is secured to the mast 16 by securing means, generally denoted in FIGS. 1-3, and 6-7 as the numeral 26 which provides for connecting the bracket at the proper location along the longitudinal axis of the mast 16 and for securing the bracket 24 at the selected pivotal position about the longitudinal axis of the mast 16. A spot light 28 is mounted to the bracket 24 for movement with the bracket 24 about the longitudinal axis of the mast 16. The electrical circuit 22 also interconnects the spot light 28 and electrical connector at the male fitting 18.

Now with reference to FIGS. 1, 2, and 3, the bracket 24 has a first end 30 mounted to the mast 16 at the top end of the mast 16 beneath the running light 20, and a second end 32 spaced from the first end 30 and located at a higher elevation relative to the running light 20 than the first end 30. As can be best seen in FIGS. 1 and 3, the bracket 24 is elongated and has an elbow 34 between the first end 30 and second end 32 so that the first end 30 and second end 32 are at different elevations but are in alignment with each other longitudinally of the bracket 24.

FIGS. 4 and 5 illustrate the bracket 24 having an elbow 34 between the first bracket end 30 and second bracket end 32 disposed such that the second end 32 is not only at a higher elevation than is the first end 30, but also such that the second bracket end 32 is not in longitudinal alignment with the first bracket end 30, but is off-set to one lateral side of the bracket 24 relative to the first bracket end 30.

With reference now to FIGS. 1 and 3, the securing means 26 includes collar means 36, such as aperture formed through the bracket 24 proximate the first end 30 of the bracket 24 for receiving the mast 16 therethrough with a slip fit, and attaching means, generally denoted as the numeral 38, for attaching the bracket 24 to the running light 20 to prevent movement of the bracket 24 from the location beneath the running light 20 along the longitudinal axis of the mast 16 and to selectively prevent pivotal movement of the collar means 36 and, therefore, pivotal movement of the bracket 24 about the longitudinal axis of the mast 16. The attaching means 38 includes a threaded first aperture 40 in the running light 20 at the interface between the first end 30 of the bracket 24 and the running light 20. The first aperture 40 is located at a predetermined distance radially away from the mast 16. The attaching means 38 further includes a plurality of second apertures 42 formed in the bracket 24 in a spaced apart arcuate array about the collar means 36 at the same predetermined distance radially away from the mast 16 as is the first aperture 40 in the running light 20. Upon pivotal movement of the bracket 24 about the longitudinal axis of the mast 16 different ones of the second apertures 42 will be moved into registration with the first aperture 40. A screw 44 is received through the second aperture 42 which is in registration with the first aperture 40 and received in the first aperture 40.

Figure 6:
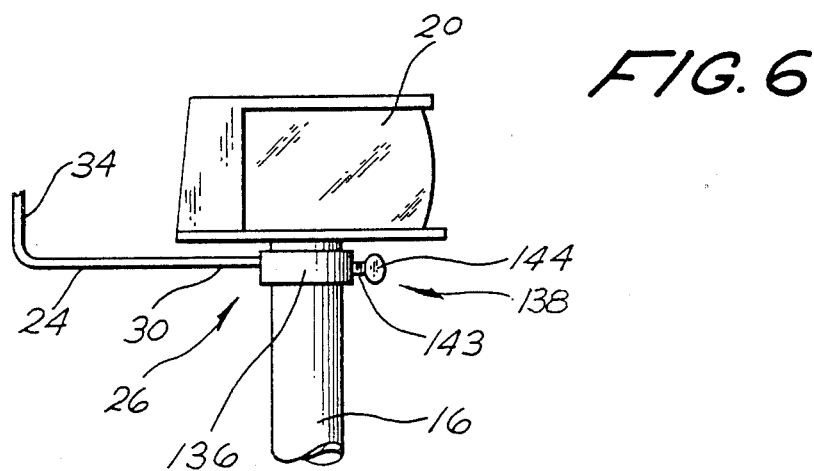
FIG. 6 illustrates a portion of the combination running light and spot light device of FIGS. 1 and 2 showing an alternative embodiment for attaching the bracket to the light mast.

Alternatively, with reference now to FIG. 6, the securing means 26 includes collar means 136 proximate the first end 30 of the bracket 24 for receiving the mast 16 therethrough with a slip fit, and attaching means 138 for attaching the bracket 24 to the mast 16 to prevent movement of the bracket 24 from the location beneath the running light 20 along the longitudinal axis of the mast 16 and to selectively prevent pivotal movement of the collar means 136 and, therefore, pivotal movement of the bracket 24 about the longitudinal axis of the mast 16. The attaching means 138 includes a threaded aperture 143 formed through the collar means 136 perpendicular to the collar opening and a set screw 144 threaded through the aperture 143 into tight contact with the portion of the mast 16 received through the collar means 136.

Figure 7:
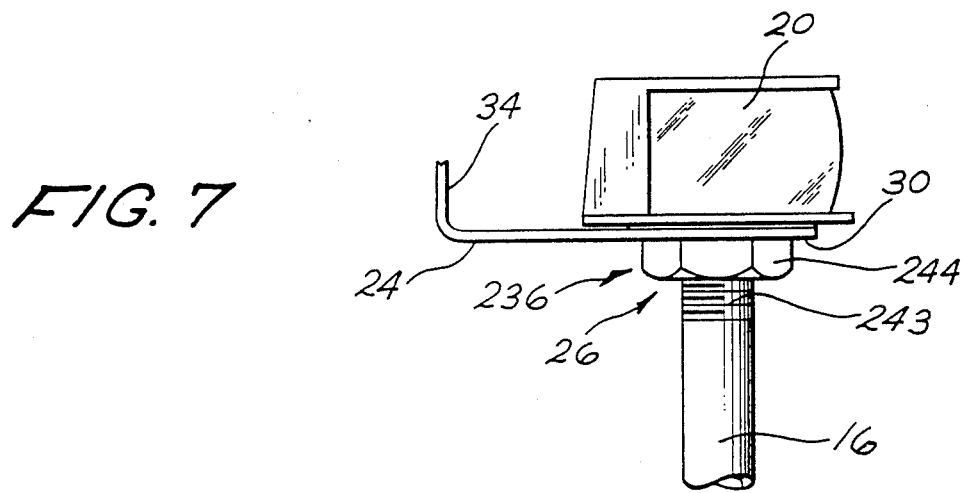
FIG. 7 illustrates a portion of the combination running light and spot light device of FIGS. 1 and 2 showing yet another embodiment for attaching the bracket to the light mast.

In another alternative embodiment, FIG. 7 illustrates the securing means 26 as including collar means 236, such as an aperture formed through the bracket 24 proximate the first end 30 of the bracket 24 for receiving the mast 16 therethrough with a slip fit, and attaching means 238 for attaching the bracket 24 against the running light 20 to prevent movement of the bracket 24 from the location beneath the running light 30 along the longitudinal axis of the mast 16 and to selectively prevent pivotal movement of the bracket 24 about the longitudinal axis of the mast 16. The attaching means 238 includes threads 243 form in the mast 16 and a nut 244 providing for tightly capturing the first end 30 of the bracket 24 between the running light 20 and the nut 244.

Now with reference to FIGS. 1 and 2, the spot light 28 is mounted proximate the second end 32 of the bracket 24 for pivotal movement about an axis generally parallel to the longitudinal axis of the mast 16 and also for pivotal movement in a vertical plane about an axis perpendicular to the longitudinal axis of the mast 16. Toward this objective, the spot light 28 is mounted to the bracket 24 by means of a gimbal type fixture, generally denoted as the numeral 46, having a horizontal axle 48 interconnecting the spot light 20 to the gimbal fixture 46 and a vertical axle 50 parallel to the longitudinal axis of the matt 16 interconnecting the gimbal fixture 46 to the spot light mounting bracket 24. The spot light 28 is vertically moved about the horizontal axis 48 and is horizontally moved about the vertical axis 50.

The combination running light and spot light device 10 provides for the mounting of the spot light 28 above the running light 20, also to one lateral side of the running light 20, and also at least somewhat to the rear of the running light 20 so that the spot light 28 will not physically interfere with the spot light 20 and so that the light beam emitted by the spot light 28 will not interfere with the light beam emitted by the running light 20.

The foregoing detailed description is given primarily for clearness of understanding and no unnecessary limitations are to be understood therefrom for modifications will become obvious to one skilled in the art upon reading the disclosure and may be made without departing from the spirit of the invention and scope of the appended claims.

I claim:

1. A combination running light and spot light device for a boat comprising:

a female receptacle having electrical connectors therein for attachment to a boat hull;

a mast having a male fitting at its bottom end receivable in the female receptacle and having electrical connectors for completing an electrical connection with the electrical connectors of the female receptacle;

a running light attached to the top end of the mast;

an electrical circuit interconnecting the running light and the electrical connector of the male fitting;

a bracket mounted to the mast proximate the top end thereof for selected pivotal movement about the longitudinal axis of the mast;

means for securing the bracket at a selected position about the longitudinal axis of the mast;

a spot light mounted to the bracket for movement with the bracket about the longitudinal axis of the mast; and, an electrical circuit interconnecting the spot light and the electrical connector of the male fitting.

2. The combination running light and spot light device of claim 1, wherein the spot light is mounted to the bracket for selected pivotal movement about an axis generally parallel to the longitudinal axis of the mast.

3. The running light and spot light device of claim 1, wherein the bracket comprises:
   a first end mounted to the mast proximate the running light;
   a second end spaced from the first end and located at a higher elevation relative to the running light than the first end; and
   the spot light being mounted proximate the second end.

4. The running light and spot light device of claim 3, wherein the second end of the bracket is displaced from the first end of the bracket transversely of the mast.

5. The running light and spot light device of claim 1, wherein the securing means comprises means for connecting the bracket at a selected location along the longitudinal axis of the mast and against pivotal movement about the longitudinal axis of the mast.

6. The running light and spot light device of claim 5, wherein the securing means comprises means for fastening the bracket to the mast to prevent movement of the bracket from the selected location along the longitudinal axis of the mast and to selectively provide pivotal movement of the bracket about the longitudinal axis of the mast.

7. The running light and spot light device of claim 6, wherein the fastening means comprises means defining a collar in the bracket for receiving the mast therethrough, and attaching means for attaching the collar to the mast to prevent movement of the bracket from the selected location along the longitudinal axis of the mast and to selectively prevent pivotal movement of the bracket about the longitudinal axis of the mast.

8. The running light and spot light device of claim 7, wherein the attaching means comprises a set screw received through an aperture in the collar and into tight contact with the portion of the mast received through the collar.

9. The running light and spot light device of claim 5, wherein the securing means comprises means for fastening the bracket to the running light to prevent movement of the bracket from the selected location along the longitudinal axis of the mast and to selectively prevent pivotal movement of the bracket about the longitudinal axis of the mast.

10. The running light and spot light device of claim 9, wherein the fastening means comprises means defining a collar in the bracket for receiving the mast therethrough, and attaching means for attaching the bracket to the running light to prevent movement of the bracket from the selected location along the longitudinal axis of the mast and to selectively prevent pivotal movement of the bracket about the longitudinal axis of the mast.

11. The running light and spot light device of claim 10, wherein the attaching means comprises a threaded first aperture formed in the running light at the interface between the bracket and the running light at a predetermined distance radially away from the mast;
   a plurality of second apertures formed in the bracket in a spaced apart arcuate array about the collar defining means at the same predetermined distance radially away from the mast as the first aperture such that upon pivotal movement of the bracket about the longitudinal axis of the mast different ones of the second apertures will be moved into registration with the first aperture; and,
   a screw received through the second aperture in registration with the first aperture and received in the first aperture.

12. The running light and spot light device of claim 9, wherein the fastening means comprises means defining a collar in the bracket for receiving the mast therethrough, and attaching means for tightly holding the bracket against the running light to prevent movement of the bracket from the selected location along the longitudinal axis of the mast and to selectively prevent pivotal movement of the bracket about the longitudinal axis of the mast.

13. The running light and spot light device of claim 12, wherein the attaching means comprises threads formed in the mast, and a threaded fastener threadably received on the threads to tightly capturing the bracket between the spot light and the threaded fastener.

14. A combination running light and spot light device to be removably connected to a female receptacle attached to a boat hull and including electrical connectors therein, comprising:
   a mast having a male fitting at its bottom end receivable in the female receptacle and having electrical connectors for completing an electrical connection with the electrical connectors of the female receptacle;
   a running light attached to the top end of the mast;
   an electrical circuit interconnecting the running light and the electrical connector of the male fitting;
   a bracket mounted to the mast proximate the top end thereof for selected pivotal movement about the longitudinal axis of the mast;
   means for securing the bracket at a selected position about the longitudinal axis of the mast;
   a spot light mounted to the bracket for movement with the bracket about the longitudinal axis of the mast; and,
   an electrical circuit interconnecting the spot light and the electrical connector of the male fitting.

* * * * *